United States Patent
Uchioke et al.

(10) Patent No.: US 7,195,326 B2
(45) Date of Patent: Mar. 27, 2007

(54) IMAGE OUTPUTTING APPARATUS FOR PRINTING AN IMAGE ON A RECORDING MATERIAL

(75) Inventors: Keizo Uchioke, Saitama (JP); Takao Miyazaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 900 days.

(21) Appl. No.: 10/004,844

(22) Filed: Dec. 7, 2001

(65) Prior Publication Data

US 2002/0075336 A1    Jun. 20, 2002

(30) Foreign Application Priority Data

Dec. 19, 2000    (JP)    .............................. 2000-385786

(51) Int. Cl.
*H04N 1/034* (2006.01)
(52) U.S. Cl. .................. 347/3; 358/1.1; 358/1.12; 358/1.15; 358/1.16; 348/234.6
(58) Field of Classification Search ............... 358/1.12, 358/1.16, 1.15, 1.1; 347/3; 348/231.6, 234.6
See application file for complete search history.

(56) References Cited

U.S. PATENT DOCUMENTS

| | | | | |
|---|---|---|---|---|
| 5,308,058 | A * | 5/1994 | Mandel et al. | 271/289 |
| 5,953,500 | A * | 9/1999 | Katakura | 358/1.12 |
| 6,424,582 | B1 * | 7/2002 | Ooishi et al. | 365/200 |
| 6,426,801 | B1 * | 7/2002 | Reed | 358/1.16 |
| 6,714,313 | B1 * | 3/2004 | Sugaya | 358/1.15 |
| 7,106,461 | B2 * | 9/2006 | Kakigi et al. | 358/1.12 |
| 2002/0054350 | A1 * | 5/2002 | Kakigi et al. | 358/1.16 |

FOREIGN PATENT DOCUMENTS

| | | |
|---|---|---|
| JP | 6-152854 | 5/1994 |
| JP | 8-133579 | 5/1996 |

OTHER PUBLICATIONS

ISO, Photography, Nov. 24, 1998, Version 3.3.*

* cited by examiner

*Primary Examiner*—Kimberly A. Williams
*Assistant Examiner*—Andrew Lam
(74) *Attorney, Agent, or Firm*—Sughrue Mion, PLLC

(57) ABSTRACT

A photo print is produced from image data. A system controller classifies the photo prints on the basis of additional information of the image data under a classification condition recorded in a smart medium. The photo prints are discharged to sorting trays. The system controller allocates the respective sorting trays to each classification. When the photo print is discharged to the sorting tray, a sorter switches a conveyance route of the photo print in response to a classification signal sent from the system controller. The photo prints are distributed to the sorting trays every classification. Owing to this, the photo prints are prevented from being discharged in a mixed state.

16 Claims, 3 Drawing Sheets

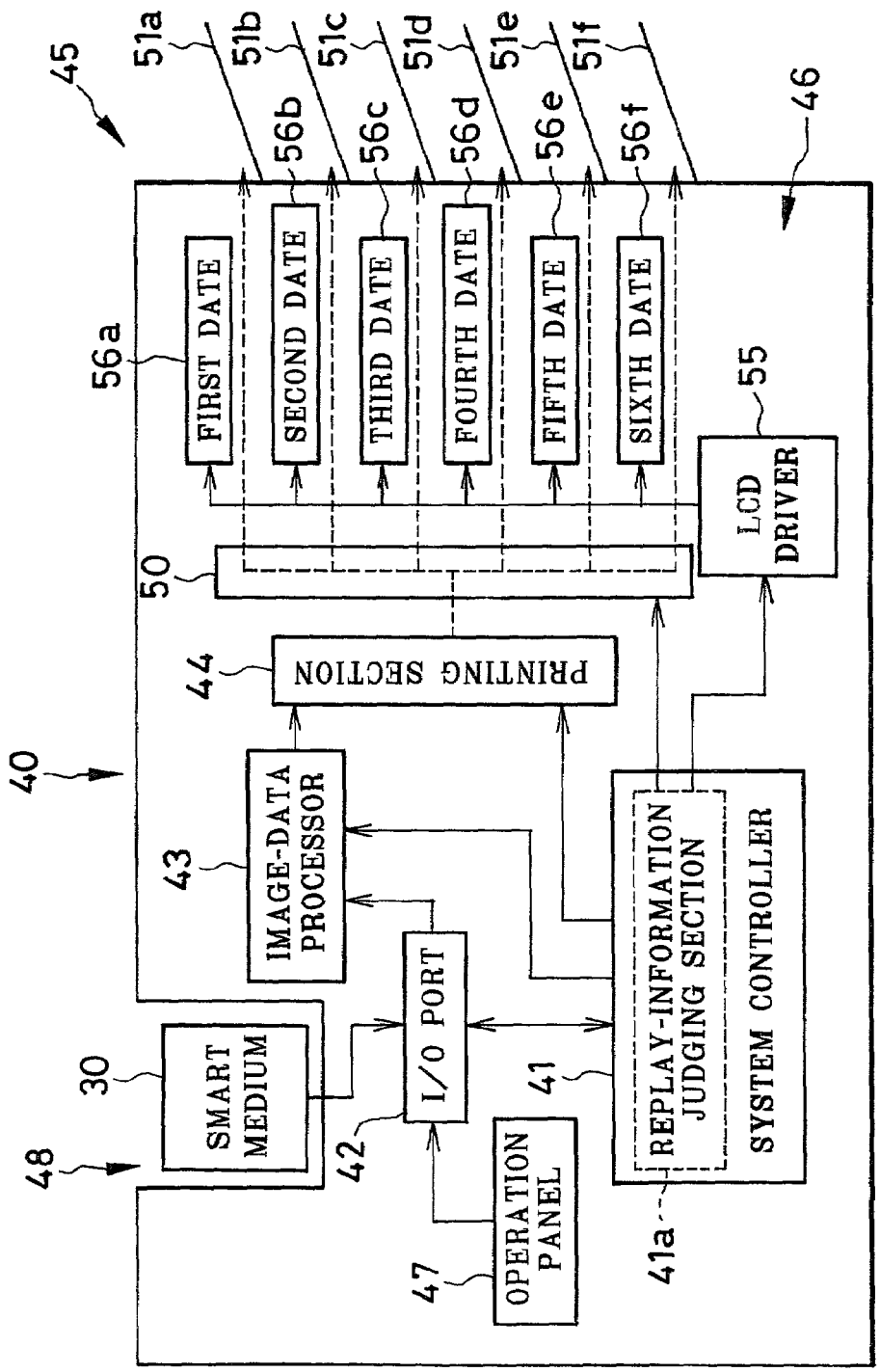

IMAGE OUTPUTTING APPARATUS FOR PRINTING AN IMAGE ON A RECORDING MATERIAL

BACKGROUND OF THE INVENTION

1. Field of the Invention

The present invention relates to an image outputting apparatus, and more particularly to an image outputting apparatus for printing an image on a recording material.

2. Description of the Related Art

In an electronic still camera, an imaging device of a CCD image sensor or the like is disposed behind a taking lens. An optical subject image is formed on a photoelectric surface of the imaging device. The formed subject image is converted into a digital signal to be recorded, as image data, in a storage medium (hereinafter, memory) of a smart medium (trade name), a compact flash memory and so forth. At the same time, information concerning the image data is also recorded in the memory as additional information. This additional information includes a photographic date, a photographer, a photographic condition and so forth. Meanwhile, the image data recorded in the memory is reproduced on an LCD monitor fitted to the electronic still camera or is reproduced on a display externally connected thereto. Further, it is possible to produce a photo print from the image data, similarly to a silver photograph, by printing the image on a recording sheet with an image outputting apparatus of a photographic printer or the like.

When some users share the image outputting apparatus, it is preferable to avoid mixing up the photo prints. In view of this, Japanese Patent Laid-Open Publication No. 6-152854 discloses the image outputting apparatus in which sorting trays for sorting the photo prints every user are registered in a sorting-data table in advance. The photo print is discharged to the corresponding tray in accordance with the sorting-data table. Meanwhile, Japanese Patent Laid-Open Publication No. 8-133579 discloses another image outputting apparatus in which the photo prints are discharged to the sorting trays respectively corresponding to an input place of the image data. In addition, the sorting tray of this Publication is provided with an indicating portion for showing the input place of the image data. Owing to this, it is easy to distinguish the input place of the photo print discharged to each tray.

Recently, the memory has high capacity so that a number of images to be recorded therein increases. With the increment of the recorded images, a print number also increases when the images stored in the memory are printed on recording sheets. In view of this, a standard DPOF (Digital Print Order Format) has been made and is adopted into a product for automatically printing the desired images, which are selected from the images taken with the electronic still camera, by using the image outputting apparatus. In the electronic still camera adjusted to the standard DPOF, various designated information are stored in the memory as a DPOF file, besides the image data and the additional information thereof. Incidentally, the various designated information include the desired image to be printed, a print type thereof, a print size thereof, a print number, and so forth. In accordance with the designated information stored in the DPOF file, a photo printer adjusted to the standard DPOF prints the image on the recording sheet along the image data.

However, in the image outputting apparatus such as described above, the photo prints are merely classified on the basis of the pre-registered information of the users and the input places of the image data. It is impossible to discharge the photo prints, classifying them on the basis of the additional information recorded in the memory together with the image data.

SUMMARY OF THE INVENTION

In view of the foregoing, it is a primary object of the present invention to provide an image outputting apparatus in which classification of photo prints is performed on the basis of additional information of image data recorded in a storage medium.

It is a second object of the present invention to provide an image outputting apparatus in which photo prints are discharged to respective sorting trays allocated every classification.

In order to achieve the above and other objects, the image outputting apparatus according to the present invention comprises a plurality of sorting trays for containing the photo prints produced from the image data. The photo prints are classified on the basis of the additional information of the image data. In accordance with the classification of the photo print, is specified the sorting tray to which the photo print is discharged. In other words, the photo print is discharged to the sorting tray corresponding to the classification.

The image data and the additional information thereof are recorded in the storage medium. The image outputting apparatus uses the storage medium to print an image on a recording sheet along the image data. In this way, the image outputting apparatus produces the photo print from the image data recorded in the storage medium.

In a preferred embodiment, the sorting trays are optionally allocated to each classification based on the additional information. The sorting tray is provided with a display on which the contents of the classification are shown. The additional information is preferable to be one of photographic information and replay information. The photographic information is given at the time of photographing, and the replay information is given after photographing.

As stated above, in the image outputting apparatus according to the present invention, a plurality of the sorting trays are arranged for containing the recording sheets, on each of which the image has been printed along the image data. The recording sheets are classified on the basis of the additional information of the image data, and are discharged to the sorting trays corresponding to the classification. Owing to this, the printed recording sheets are prevented from being discharged in a mixed state.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 3 is a block diagram showing a structure of a photo printer.

DETAILED DESCRIPTION OF THE PREFERRED EMBODIMENT(S)

Figure 1:
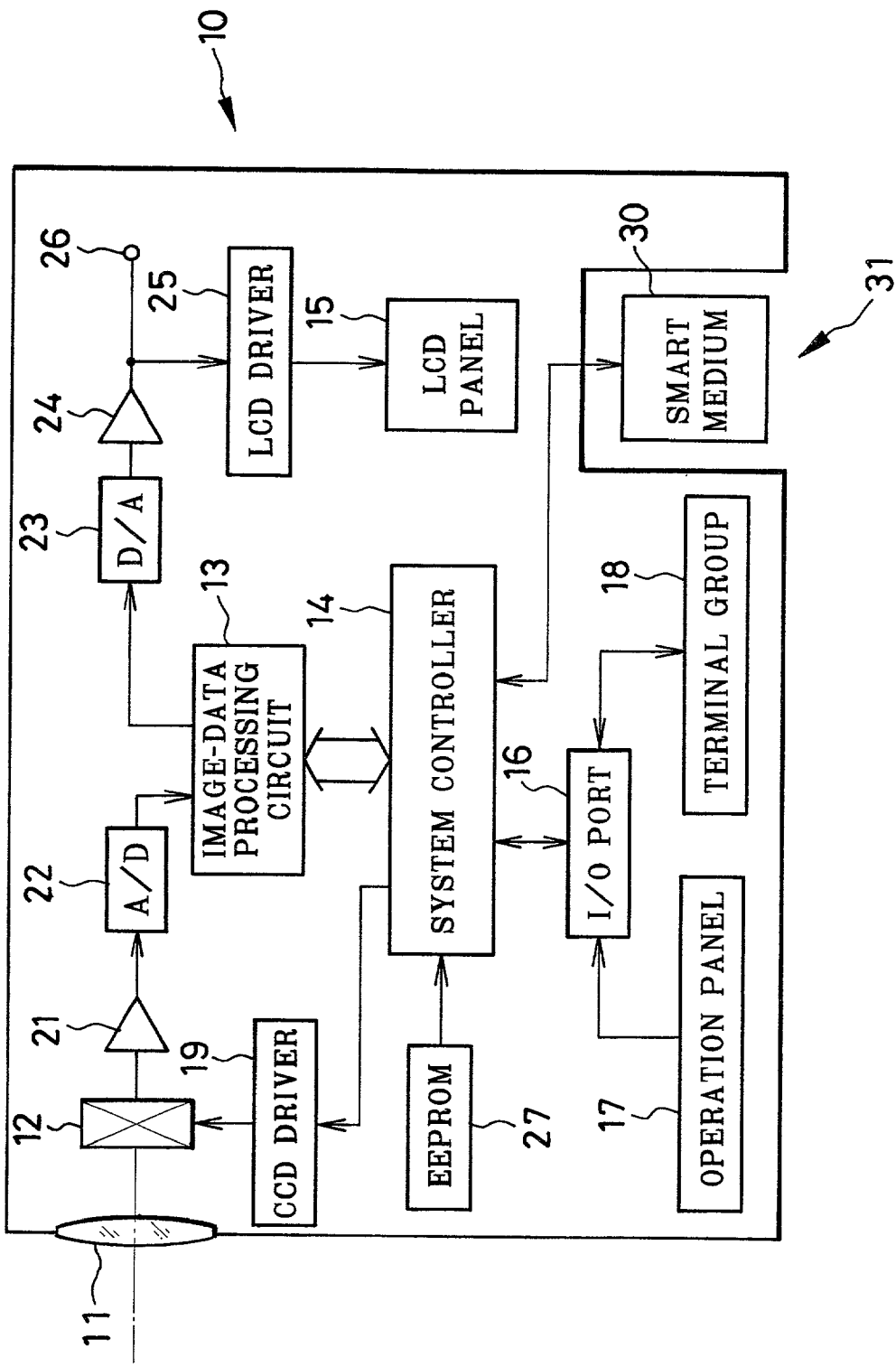
FIG. 1 is a block diagram showing a structure of an electronic still camera.

FIG. 1 is a block diagram showing a structure of an electronic still camera 10 which is constituted of a taking lens 11, a CCD image sensor 12, an image-data processing circuit 13, a system controller 14, an LCD panel 15, and so forth. The system controller 14 totally controls an electrical operation of the electronic still camera 10 including the image-data processing circuit 13. Further, the system controller 14 executes signal processing in response to input signals send, via an I/O port 16, from an operation panel 17 and a terminal group 18 used for external connection.

The CCD image sensor 12 is disposed behind the taking lens 11. A photoelectric surface of the CCD image sensor 12 is provided with micro color filters of R, G and B arranged in matrix. An optical subject image is formed on the photoelectric surface of the CCD image sensor 12 through the taking lens 11. The optical subject image is converted into electrical image signals of the respective colors by means of a CCD driver. And then, the image signal is outputted from the CCD image sensor 12.

After the image signal has been amplified by an amplifier 21, the image signal is converted into a digital signal by an A-D converter 22 and is inputted into the image-data processing circuit 13 as image data. The image-data processing circuit 13 executes the predetermined signal processing for the inputted image data and records the processed image data in a smart medium described later. At the same time, a picture signal corresponding to a composite signal of NTSC system is produced on the basis of the image data for which the predetermined signal processing has been executed. The picture signal is inputted into an LCD driver 25 via a D-A converter 23 and an amplifier 24.

The LCD panel 15 is disposed on a rear face of a camera body (not shown) and is driven by the LCD drive 25. The LCD panel 15 continuously displays the subject image under a photograph mode. Meanwhile, under a reproduction mode, the LCD panel 15 displays an image stored in the smart medium such as described later. The picture signal is also outputted to an output terminal 26. When a display is connected to the output terminal 26, it is possible to watch both of the continuous subject image taken by the CCD image sensor 12 and the image stored in the smart medium. Incidentally, a drive source of the CCD driver 19 is synchronized with sampling timing of the A-D converter 22.

An EEPROM 27 stores various adjustment data in advance. The system controller 14 refers to the adjustment data when operating the electronic still camera 10 in accordance with a predetermined sequence. As to the adjustment data, there are data concerning the focus of the taking lens 11, color correction, and so forth.

The smart medium 30 is set to a holder 31 provided in the camera body (not shown) when the electronic still camera 10 is used. The smart medium 30 is constituted of a DRAM which is capable of accessing at high speed. In the smart medium 30, image files and a DPOF file are stored such as described later.

Figure 2:
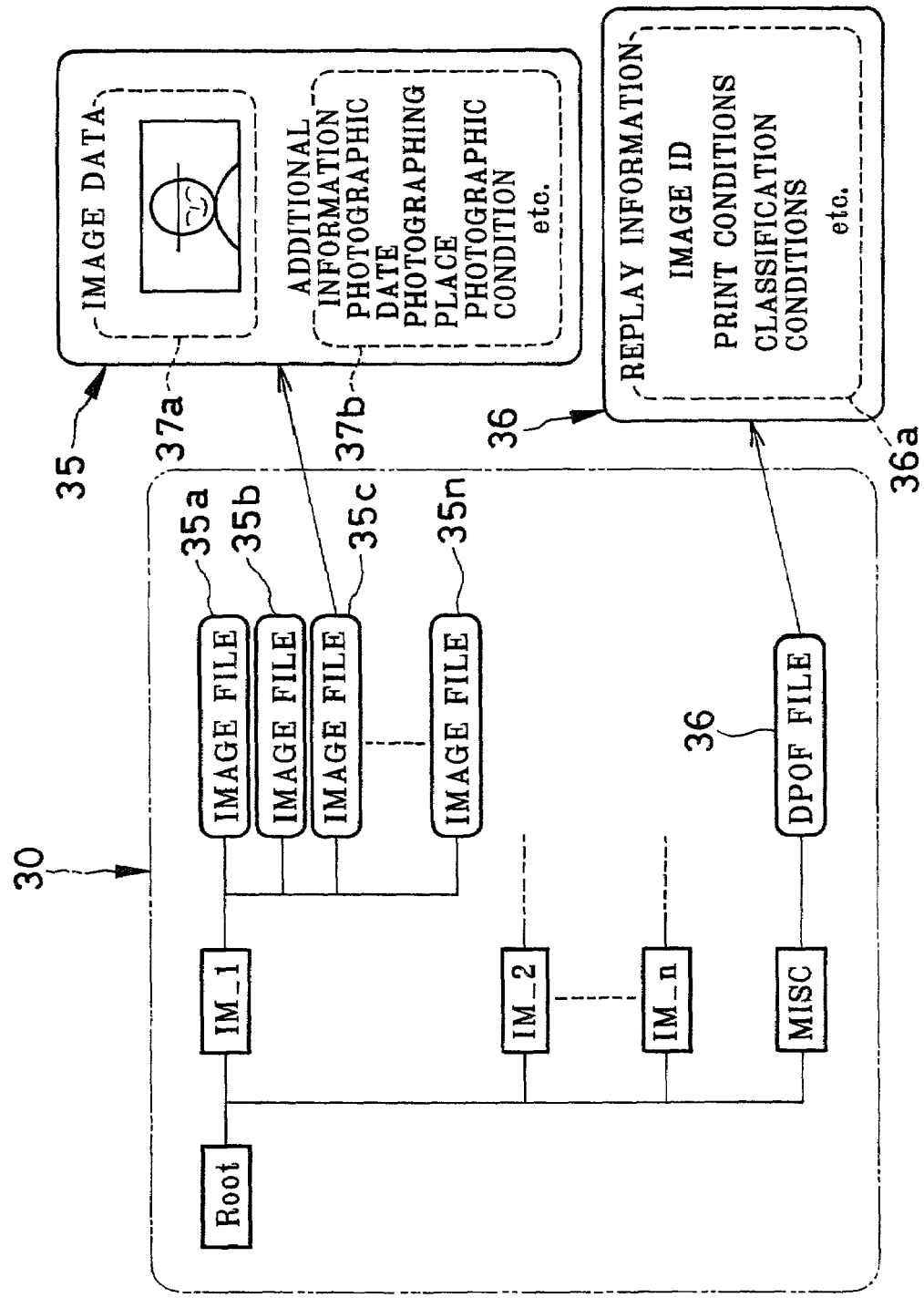
FIG. 2 is a schematic illustration showing a structure concerning a directory of a smart medium.

FIG. 2 shows a directory structure of the smart medium 30. Under a root-directory "Root", sub-directories "IM_1" to "IM_n" and "MISC" are respectively formed. The sub-directories "IM_1" to "IM_n" store the image files 35a to 35n of the taken images one frame by one frame. The sub-directory "MISC" stores the DPOF file 36.

Each of the image files 35 includes the image data 37a for which the predetermined signal processing has been executed by the image-data processing circuit 13. In addition, the image file 35 also includes additional information 37b concerning the image data 37a. As the additional information, are recorded a photographic date, a photographer, a photographing place, photographic conditions (exposure conditions, a shutter speed, etc.), an ID number of a photographing device, and so forth. When the image data 37a of the taken subject image is recorded in the smart medium 30, the additional information 37b is automatically recorded therein on the basis of information given prior to photographing. In another way, a user can manually record the additional information 37a with the operation panel 17 after photographing.

The DPOF file 36 stores replay information 36a for designating the image (image ID) which is desired to be printed by using a photo printer adjusted to the standard DPOF. The desired image is selected among the respective image data 37a recorded in the smart medium 30. Moreover, the replay information designates print conditions of the desired image, for example, a print size, a print number, trimming, print of the photographic date, and so forth.

For instance, when a photo print produced from the image data 37a is classified on the basis of the photographic date, a classification condition for classifying the photo print by the photographic date is recorded as the replay information 36a besides the image ID and the print conditions. Incidentally, the replay information 36a is assigned, before printing, by a user with the operation panel 17 provided on the electronic still camera 10.

FIG. 3 is a block diagram showing a structure of the photo printer adjusted to the standard DPOF. The photo printer 40 is constituted of a system controller 41, an I/O port 42, an image-data processor 43, a printing section 44, a sorting section 45, and a displaying section 46. The system controller 41 totally controls an electrical operation of the photo printer 40. Further, the system controller 41 executes signal processing in response to input signals send from an operation panel 47 connected to the I/O port 42.

The photo printer 40 is provided with a holder 48. Upon setting the smart medium 30 to the holder 48, the DPOF file 36 recorded in the smart medium 30 is read into the system controller 41 via the I/O port 42. A replay-information judging section 41a judges the image ID, the print condition, and the classification condition of the replay information 36a recorded in the DPOF file 36. Meanwhile, the system controller 41 reads the additional information 37b of the image file 35 designated by the classification condition. Successively, the system controller 41 allocates sorting trays to which the photo prints are discharged in accordance with the classification. The sorting tray is described later in detail.

The system controller 41 sends an image processing signal to the image-data processor 43. The image processing signal is for instructing the print condition except the image ID and the print number. Moreover, the system controller 41 sends a print signal instructing the print number to the printing section 44, and sends a classification signal instructing the classification of the photo prints to the sorting section 45. Further, the system controller 41 sends a display signal to the displaying section 46. The display signal is for displaying the classification information allocated to the respective sorting trays.

Into the image-data processor 43, the image file 35 recorded in the smart medium 30 is properly read via the I/O port 42 in response to the image processing signal inputted from the system controller 41. Image processing is executed for the image data 37a on the print condition instructed by the image processing signal. At the same time, image composite processing is executed such that the photographic date is displayed within a picture frame. After completing the image processing and the image composite processing, the image data is sent to the printing section 44.

The printing section 44 prints the image data, which is inputted from the image-data processor 43, on a recording sheet to produce the photo print. The print number of the photo prints is instructed by the print signal inputted from the system controller 41. The photo print is discharged to the sorting section 45.

The sorting section 45 is constituted of a sorter 50 and the sorting trays 51a to 51f. Based on the classification signal sent from the system controller 41, the sorter 50 distributes the photo prints, which have been discharged from the printing section 44, to respective conveyance routes (shown by broken lines) in accordance with the classification. In this way, the photo prints are respectively discharged to the corresponding trays 51a to 51f allocated on the basis of the classification.

The displaying section 46 is constituted of an LCD driver 55 and LCD panels 56a to 56f. The LCD driver 55 displays the classification information, which are allocated to the respective trays 51a to 51f in accordance with the classification signal sent from the system controller 41, on the LCD panels 56a to 56f. FIG. 3 shows a case in that the photo prints are classified on the basis of the photographic date. In this case, the photographic dates allocated to the sorting trays 51a to 51f are displayed on the LCD panels 56a to 56f respectively. The LCD panels 56a to 56f are respectively disposed near the corresponding sorting tray. However, the LCD panel may be provided on the corresponding sorting tray itself. By the way, in the present embodiment, the sorting trays 51a to 51f and the LCD panels 56a to 56f are provided as six pairs. However, a number of the pairs is not exclusive. In compliance with the structure and the utilization of the photo printer 40, the number of the pairs may be increased or decreased, for instance, may be ten or twenty.

Next, an operation of the above structure is described below. When a user hopes to print some images desired among the images taken by the electronic still camera 10, the user designates the image ID and the print condition of each of the desired images with the operation panel 17 of the electronic still camera 10. At this time, when the user also hopes to classify the photo prints of the desired images on the basis of the photographic date, the user further designates the classification condition for classifying the photo print every photographic date. The image ID, the print condition and the classification condition respectively designated by the user are recorded in the DPOF file 36 of the smart medium 30 as the replay information 36a.

Upon setting the smart medium 30 to the holder 48 of the photo printer 40, the DPOF file 36 is read into the system controller 41 first. The replay-information judging section 41a judges the image ID, the print condition and the classification condition from the replay information 36a recorded in the DPOF file 36. Successively, the system controller 41 reads the data of the photographic date designated in the classification condition, from the additional information 37b. Further, the system controller 41 allocates the sorting trays 51a through 51f to which the classified photo prints are discharged every photographic date. The photographic dates respectively corresponding to the sorting trays 51a through 51f are displayed on the LCD panels 56a through 56f.

The image file 35 designated by the image ID of the replay information 36a is appropriately read into the image-data processor 43. The image processing is executed for the image data 37a on the designated print condition. Further, the image composite processing is also executed to display the photographic date within the picture frame. After that, printing the image data 37a is performed on the At1 recording sheet by the printing section 44 to produce the photo print. The conveyance route of the photo print discharged from the printing section 44 is switched by the sorter 50 in accordance with the classification signal sent from the system controller 41. In other words, the photo prints are sorted on the basis of the photographic date. Hence, the photo print having a certain photographic date is discharged to the sorting tray corresponding to this photographic date.

In the above-described embodiment, the classification is performed on the basis of the photographic date. The present invention, however, is not exclusive to this. For instance, the classification may be performed on the basis of the additional information of the photographer, the photographing place, the photographic condition, and so forth. Moreover, the classification may be performed on the basis of the replay information of the print size, the print resolution, and so forth. Further, the classification may be performed on the basis of a combination of the above-noted items.

Moreover, based on the additional information designated in the classification condition of the DPOF file, the sorting tray is automatically allocated to each classification at the side of the photo printer. However, the DPOF file may store sorting-tray information for allocating the sorting trays, and the photo prints may be sorted in accordance with the sorting-tray information.

Further, a predetermined number of the sorting trays may be allocated under the classification condition. The other sorting trays may sort the photo prints in accordance with the sorting-tray information recorded in the DPOF file.

In the above embodiment, the classification condition is set at the side of the electronic still camera. However, the classification condition may be set at the side of the photo printer before inputting the image or before performing the print. In this case, the classification condition is set by using an operation panel provided on the photo printer. Moreover, the above embodiment employs the electronic still camera and the photo printer which are adjusted to the standard DPOF. However, if the image data and the additional information thereof are recorded in a certain recording medium, another recording format may be adopted. Further, instead of the photo printer, it is possible to use a color thermal printer, an ink jet printer, a digital printer for exposing a photosensitive material, and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image outputting apparatus for printing an image on a recording sheet by using a storage medium in which a plurality of the images are recorded, said storage medium also storing additional information of the respective images, said image outputting apparatus comprising:

a system controller for classifying said images on the basis of said additional information;

a plurality of sorting trays for containing said recording sheet on which said image has been printed, a sorting tray of said plurality of sorting trays being allocated to each classification of said image by said system controller;

a sorter for discharging said printed recording sheet to said sorting tray, said sorter being controlled by said system controller so as to discharge said recording sheet to said sorting tray corresponding to said classification, a holder for accepting the storage medium, and wherein the storage medium is a detachable medium.

2. An image outputting apparatus according to claim 1, wherein said sorting tray is optionally designated to each classification.

3. An image outputting apparatus according to claim 1, further comprising:

a displaying member provided so as to correspond to said sorting tray, said displaying member showing said additional information used for classifying said images.

4. An image outputting apparatus according to claim 3, wherein said displaying member is disposed near said sorting tray.

5. An image outputting apparatus according to claim 3, wherein said displaying member is disposed on said sorting tray itself.

6. An image outputting apparatus according to claim 3, wherein said additional information is photographic information given at the time of taking said image.

7. An image outputting apparatus according to claim 6, wherein said image in said storage medium is taken by an electronic still camera and is recorded thereby.

8. An image outputting apparatus according to claim 7, wherein said additional information is automatically recorded by said electronic still camera.

9. An image outputting apparatus according to claim 8, wherein said additional information is a photographic date of said image, said images being classified on the basis of said photographic date.

10. An image outputting apparatus according to claim 9, wherein said displaying member shows said photographic date.

11. An image outputting apparatus according to claim 3, wherein said additional information is replay information for replaying said image, said replay information being written in said storage medium after recording said image therein.

12. The image outputting apparatus according to claim 1, wherein said additional information is at least one of a photographer and a photographic condition.

13. The image outputting apparatus according to claim 12, wherein said photographic condition comprises at least one of exposure conditions and a shutter speed.

14. The image outputting apparatus according to claim 1, wherein said classification is based on at least one of print size and print resolution.

15. The image outputting apparatus according to claim 1, wherein the storage medium is configured to be used in an electronic camera.

16. The image outputting apparatus according to claim 1, wherein each image of the plurality of images is recorded along with the corresponding additional information.

* * * * *